United States Patent
Umei

[19]

[11] Patent Number: 5,815,211
[45] Date of Patent: Sep. 29, 1998

[54] IMAGE PROCESSING SYSTEM AND METHOD FOR OUTPUTTING A SUPERPOSED VIDEO SIGNAL INCLUDING VIDEO AND INFORMATION

[75] Inventor: Sachio Umei, Tokyo, Japan

[73] Assignee: Samsung Aerospace Industries, Ltd., Kyungsangnam, Rep. of Korea

[21] Appl. No.: 601,564

[22] Filed: Feb. 14, 1996

[30] Foreign Application Priority Data

Feb. 15, 1995 [JP] Japan ..................................... 7-026349

[51] Int. Cl.⁶ ....................................................... H04N 7/08
[52] U.S. Cl. .......................... 348/478; 348/239; 348/589
[58] Field of Search ................................... 348/478, 239, 348/479, 563, 564, 589, 598, 72, 73, 74, 722, 222

[56] References Cited

U.S. PATENT DOCUMENTS

| | | | |
|---|---|---|---|
| 4,819,065 | 4/1989 | Eino | 348/239 |
| 5,128,765 | 7/1992 | Dingwall et al. | 348/563 |
| 5,196,928 | 3/1993 | Karasawa et al. | 348/239 |
| 5,502,487 | 3/1996 | Choi | 348/239 |
| 5,541,663 | 7/1996 | Ohno | 348/478 |
| 5,583,566 | 12/1996 | Kanno et al. | 348/72 |

*Primary Examiner*—Victor R. Kostak
*Attorney, Agent, or Firm*—Finnegan, Henderson, Farabow, Garrett & Dunner, L.L.P.

[57] ABSTRACT

An image processing camera which picks up an image of an object by a pick-up device and outputs a converted electric signal, generates the operational information of the image processing camera synchronized during a vertical fly-back time of the video signal and outputs the operational information generated from the generating device superposed during a vertical fly-back time of the video signal. In order to provide a method for outputting a video signal, an image processing camera and an image processing system using the afore-mentioned method can perform image processing of a video signal using the operational information of an image processing camera on a video signal output from an image processing camera, therefore reducing the cable necessary between an image processing camera and an image processing apparatus.

4 Claims, 3 Drawing Sheets

IMAGE PROCESSING SYSTEM AND METHOD FOR OUTPUTTING A SUPERPOSED VIDEO SIGNAL INCLUDING VIDEO AND INFORMATION

BACKGROUND OF THE INVENTION

1. Field of the Invention

The present invention relates to image processing; and more particularly to a system and method of applying a combined video signal and Interval Test Signal (ITS) of an image processing camera to a TV monitor.

2. Description of the Prior Art

Image processing cameras, presently use a solid state pick-up device, which is more stable than a camera tube and produces few after-images. Specifically, the image processing camera uses a CCD image area sensor as the solid state pick-up device. Therefore, an image of an object is picked up optically by the CCD image area sensor, and the optical signal is then converted into an electric signal and subsequently output as a video signal.

The an image processing camera is connected also to an image processing apparatus, which processes the video signal output from the camera, using predetermined information such as AGC, γ, gain, and the set-up on/off state. The image processing camera may be also connected to a monitor which displays the processed image.

Therefore, in an image processing system where the image processing camera is connected to an image processing apparatus requires cable to transmit the video signal output from the camera and also cable to transmit the operational information of the camera. However, in keeping with the recent trend to miniaturize and lighten electronic apparatus, it is desirable to reduce the necessary cable in the image processing system.

For example, image processing cameras, such as described above are used in various industrial systems for measurement, control, etc. Because industrial systems are designed to occupy minimal space, it is desirable to minimize the amount of cable and cable connection terminals necessary to transmit a great deal of control and measurement data.

SUMMARY OF THE INVENTION

Accordingly, an object of the present invention is to solve the problems of prior art by superposing or multiplexing predetermined operational or status type information of the image processing camera onto a video signal from the camera, as well as reducing the amount of cable necessary to connect the camera to the image processing apparatus, providing a method for outputting a video signal of the image, and providing an image processing camera and system using the method to perform image processing of a video signal with predetermined information.

The present invention comprises:

optically sensing an image of an object with a CCD;

converting and outputting a video signal into an electric signal;

superposing operational information with the video signal during a vertical, fly-back time of a video signal.

In particular, operational information includes at least one of AGC, γ, gain, set-up on/off state, speed of shutter, motion mode, or image processing and is superposed during a vertical fly-back time of a video signal as a binary code signal.

The present invention further comprises:

generating means which synchronizes a vertical fly-back time of a video signal and generates operational information of an image processing camera; and outputting means which superposes and outputs the operational information generated from an occurrence means on a vertical fly-back time of a video signal.

Particularly, the occurrence means obtains information such as AGC, γ, gain, set-up on/off state, speed of shutter, motion mode, and image processing, etc., which is operational information of an image processing camera by switching an electronic switch and representing the information as a binary code signal as well as using a CCD image area sensor with the CCD.

And the image processing system of the present invention is a device that uses the image processing camera and joins an indicator, which indicates a processed image, and an image processing apparatus which processes a video signal by using operational information of the image processing camera.

Also, the image processing system mentioned above is a device that can connect a detecting apparatus which detects operational information of an image processing camera positioned in parallel with the image processing apparatus.

According to the method for outputting a video signal, the image processing camera and the image processing system using the method superposes operational information of an image processing camera during a vertical fly-back time of a video signal output from the image processing camera. Hence, it is possible to output operational information from another cable using the one cable for video signal.

In particular, by superposing this operational information during a vertical fly-back time of a video signal, it can perform a signal treatment identically with a signal part of an available screen of a video signal making information such as AGC, γ, gain, set-up on/off state, speed of shutter, motion mode, and image processing as a binary signal.

Because this process eliminates the need for a cable for transmitting information of an image processing camera and the joining tool of the above-mentioned cable, it is consistent with the recent trend to minimize the space necessary to arrange various types of industrial installations, such as measurement, control, etc.

Particularly, because the image processing method can check the setting state of operational information with a detection device in parallel with an image processing apparatus, confirmation of a cause and a change of operational situation can be promptly performed in case the setting is abnormal.

DETAILED DESCRIPTION OF THE PREFERRED EMBODIMENT

Figure 1:
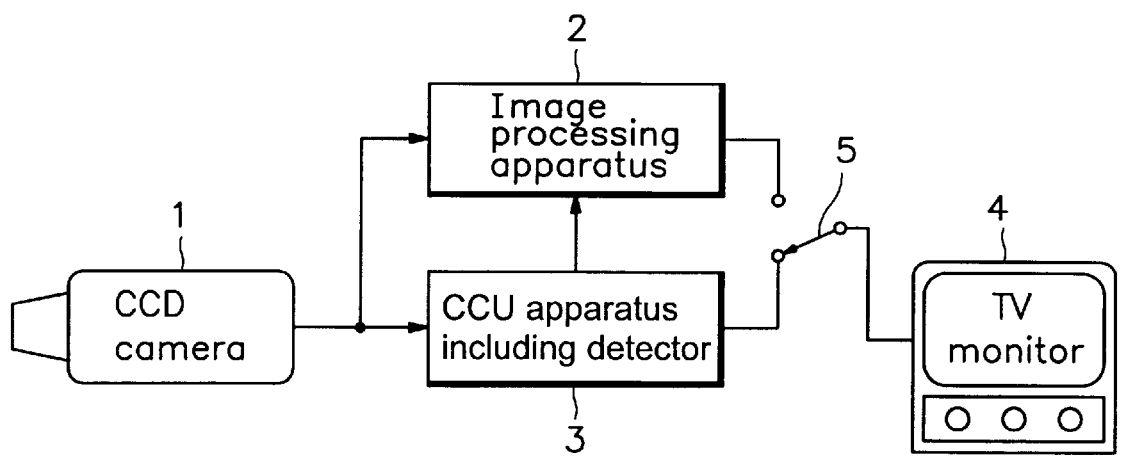
FIG. 1 is a block diagram of an image processing system according to one embodiment of the present invention.
Figure 2:
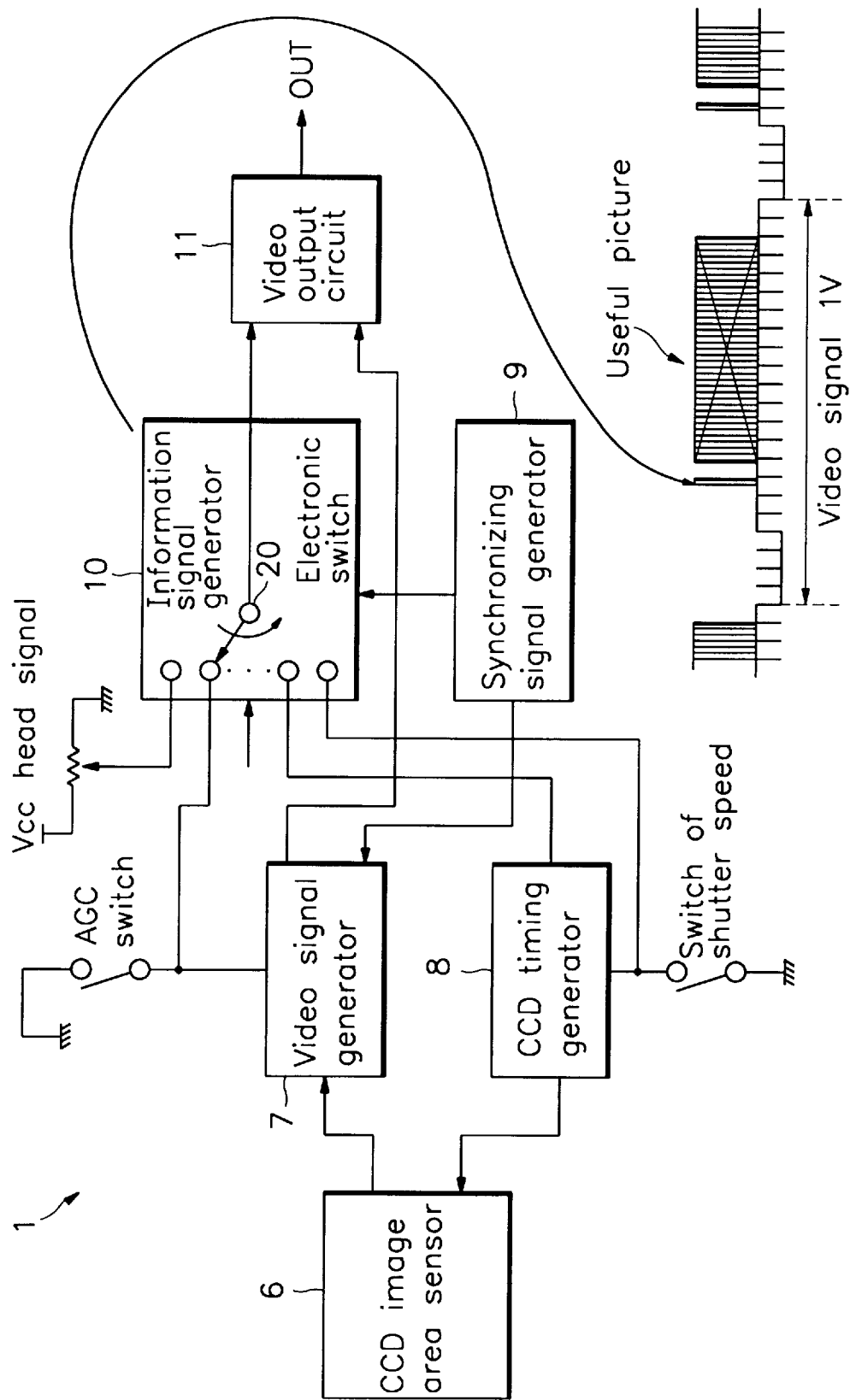
FIG. 2 is a detailed circuit diagram of an image processing camera used in the image processing system of the present invention.
Figure 3:
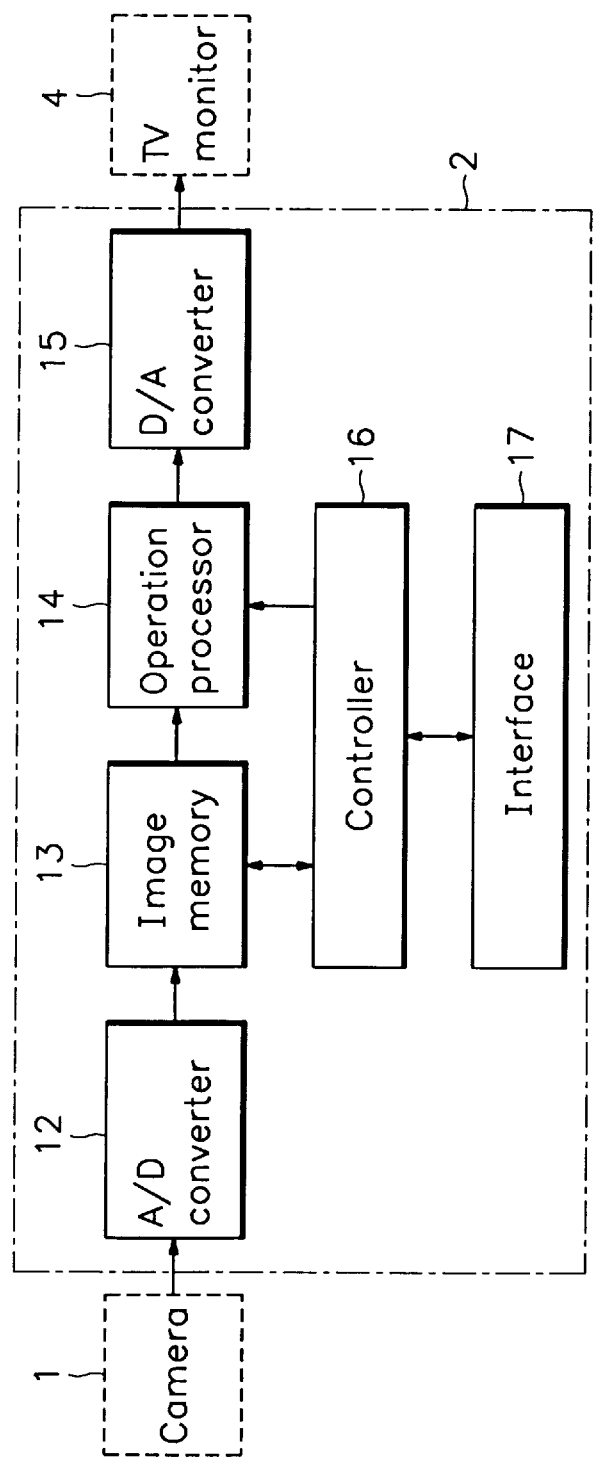
FIG. 3 is a block diagram showing an image processing apparatus used in the image processing system of the present invention.

FIGS. 1–3 illustrate a preferred embodiment of an image processing system of the present invention. Response to FIG. 1, a camera 1 optically picks up an image of an object using a CCD pick-up device, converts the image into an electric signal, and outputs it as a video signal. An image processing apparatus 2 outputs a corresponding image after image-processing a video signal output from the CCD camera 1. A camera control unit (CCU) apparatus 3 detects predetermined information, hereinafter referred to as operational information of the CCD camera 1. A TV monitor 4 displays an image processed by the image processing apparatus 2 superposed with the predetermined operational information detected by the CCU apparatus 3. A switch 5 switches between outputs of the image processing apparatus 2 and the CCU apparatus 3. The CCD camera 1 and the image processing apparatus 2 are connected by one cable.

Referring to FIG. 2, a CCD camera 1 comprises a CCD image area sensor 6 which converts an optical signal into an electric signal; a video signal generator 7 which generates a video signal; a CCD timing generator 8 which generates the timing of the CCD image area sensor 6; a synchronizing signal generator 9 which generates a synchronizing signal; an information signal generator 10 which generates a predetermined or operational information signal; and a video output circuit 11 which outputs a video signal.

In the CCD camera 1, an electric image signal from the CCD image area sensor 6 is input to the video signal generator 7, and the generated video signal is then input to a video output circuit 11. The CCD image area sensor 6 picks up images of objects in response to timing signals output by CCD timing generator 8. The synchronizing signal generator 9 transmits a synchronizing signal to the video signal generator 7 and the information signal generator 10. Information signal generator 10 selects one of the various signal lines with an electronic switch which is a special feature of the preferred embodiment.

The scanning method of a video signal is a horizontal scanning method which scans an image sequentially from top to bottom. When the scanning reaches the lowest line of the image, a synchronization takes place during the vertical fly-back time of the scanning to the top. The operational information signal output from the information signal generator 10 is superposed into the video output circuit 11.

The IV width of a video signal includes a first head signal, the binary code signal of the operational information, for example, AGC, γ, gain, set-up on/off state, and image processing. Then a useful picture signal is formed for output as a video signal.

Referring to FIG. 3, the image processing apparatus 2, which may be, for example, a CPU chip, comprises an A/D converter 12, an image memory 13, a processor 14, a D/A converter 15, a controller 16, and an input or input interface 17. A superposed video signal with the operational information output by CCD camera 1 is converted into a digital signal by the A/D converter 12 and stored in image memory 13. The processor 14 image-processes the digital signal according to input control by the input interface 17 and the control program of the controller 16. The D/A converter 15 then converts the image-processed signal back into an analog signal and outputs the analog signal to a TV monitor 4.

The CCU apparatus 3 of FIG. 1 detects the signal corresponding to the operational information of the camera, which is superposed onto the video signal output from CCD camera 1. This operation information signal is transmitted to the TV monitor 4 while the switch 5 is connected to the CCU apparatus 3. These TV settings can be checked for abnormalities and the cause can be identified and promptly corrected in accordance with the operational information signal.

The TV monitor 4 can either display an image processed by the image processing apparatus 2 or the predetermined information by the CCU apparatus 3 depending upon the position of the switch 5.

Referring to FIG. 3, the operation for image-processing a video signal is explained as follows.

First, an optical signal picked up by the CCD camera 1 is converted into an electric signal and input into the image processing apparatus 2 as an analog video signal. The image processing apparatus 2 converts this analog video signal into a digital signal in the A/D converter part 12 and stores it in the image memory 13.

Processor 14 performs image-processing according to the information stored in image memory 13, the control program of controller 16, and control of input interface 17. For example, processor 14 manages a reduction and partition of an image and performs the process for a stationary optical photograph (SOP) image as well as a process for a dynamic moving image in real time.

Here, a preferred embodiment of an image processing system superposes the predetermined information signal, such as AGC, γ, gain, set-up on/off state, shutter speed, and motion mode, during a vertical fly-back time of a video signal. The contents of the predetermined information signal will be described later.

D/A converter 15 converts the image-processed signal into an analog signal which is output to a TV monitor 4 where the processed image is displayed.

The operation of the CCD camera 1 is described with reference to FIG. 2. CCD image area sensor 6 optically senses an image of an object, converts the optical signal into an electric signal, and outputs the electric signal to the video signal generator 7. The video signal generator 7 converts the electrical signal into a video signal and outputs the video signal to the video output circuit 11. The synchronizing signal generator 9 outputs a synchronizing signal to the video signal generator 7 and the information signal generator 10 and synchronizes the signal during a vertical fly-back time of a video signal output from video signal generator 7. Information signal generator 10 outputs the operational information as a binary code signal to the video output circuit 11. Therefore, the video output circuit 11 of the image processing apparatus 2 of the present invention outputs a video signal which superposes the operational information during a vertical fly-back time of a video signal.

Next, superposing or multiplexing the operational information during a vertical fly-back time of a video signal is described.

The video signal generator 7 and the information signal generator 10 operate in response to the synchronizing signal generated by the synchronizing signal generator 9. For example, as illustrated in FIG. 2, during an 1V-width of a video signal, a signal corresponding to the position or setting of electronic switch 20 is superposed preceding a useful picture signal. In this embodiment, the switch 20 condition changes to first output a head signal, operational information of the setting switch in binary code such as AGC, γ, gain, set-up on/off state, shutter speed, motion mode, and image processing, and useful picture signal, respectively.

The contents of the operational information superposed on a video signal are as follows.

(1) Automatic Gain Central (AGC) correction changes the image content by performing an AGC on the mean value or the peak magnitude of an image. If the mean value is used, the waveform corresponding to the peak magnitude is lost.

However, if the peak magnitude is used, the waveform is maintained and the entire gain of the signal is controllable.

(2) γ (phase) correction switching (0.45 or 1) is a process of performing a waveform correction according to the phase or γ value.

(3) A gain correction is a process that corrects amplification of waveform. Because the increase in gain increases noise, noise can be managed by adjusting the state of the switch of the CCD camera 1 in the image processing apparatus 2.

(4) The shutter speed, i.e., image reading time, is the same as the shutter speed of a conventional film type camera, such as 1/60 sec., 1/125 sec., . . . , 1/1000 sec. Shutter speed is determined by setting the state of the corresponding switch of the CCD camera 1.

(5) In a motion mode image-processing is performed to conform to frame storage and a field storage of a CCD.

(6) The image-processing performs the process of a video signal to output an image as part of the video signal to be combined. The processing of the operational information may be performed in the internal image processing apparatus 2 based on the operational information signal superposed on the cable transmitting the video signal.

Therefore, a preferred embodiment of the present image processing system may perform image processing by mounting the image processing apparatus 2 inside the CCD camera 1, thereby requiring only one cable for a video signal for a switch setting state of a CCD camera 1 by synchronizing the signal output from synchronizing signal generator 9. In the present system, the setting information of the information signal generator 10 is superposed with a video signal of the video signal generator 7 during a vertical fly-back time of a video signal and output to the video output circuit 11.

Particularly, with the present system the useful picture signal portion of the video signal is identical to the setting information of the CCD camera, such as AGC, γ, gain, set-up on/off state, shutter speed, motion mode, and image-processing. Also, in case of an abnormal state, the system including the CCU apparatus 3 can promptly verify the cause and change and manage the setting state by checking the predetermined information signal that is superposed on the video signal.

As mentioned above, a preferred embodiment of the present invention is described referring to the attached drawings. It is to be understood that both the general description and the detailed description above are exemplary and explanatory and are intended to provide further explanation of the invention as claimed. The present invention is not limited to the above embodiment. For example, the image processing system according to the preferred embodiment of the present invention is applicable generally, not only to a system composition as in FIG. 1 and the composition of a CCD camera as in FIG. 2, but to any CCD camera which includes an operational information generator, a video signal generator, and an image processing camera.

Also, superposing the operational information during the vertical fly-back time of a video signal can also apply to systems where information other than or beyond the superposed image-processing information above described.

According to the preferred embodiment of the present invention, the effects of the representative device can be explained briefly as follows:

(1) The device can perform image processing by joining an image processing camera to an image processing apparatus with one cable, because it can output operational information of the image processing camera on a video signal cable by superposing the camera information during vertical fly-back time of the video signal output from the camera.

(2) The device can perform a signal process on the useful picture signal part of a video signal identical to the setting of the image processing camera by superposing binary code signal as the operational setting information of the image processing camera during the vertical fly-back time of the video signal.

(3) The device can also detect and alter an abnormal setting state by checking the setting state while detecting the operational information of an image processing camera by connecting a device which detects the operational information of image-processing in parallel with the image processing apparatus.

(4) According to the foregoing, the device can reduce the amount of information transmission cable of an image processing camera and cable connection terminals and therefore conforms well to the recent trend to miniaturize and lighten electronic apparatus and facilitating minimal space requirements for various industrial installations, such as measurement and control.

What is claimed is:

1. An image processing system for outputting a video signal, comprising:

a processor for processing the video signal for output to a video input of a TV monitor;

a detector to detect an information signal of a CCD camera; and outputting means for superposing the information signal on the video input during vertical fly-back of a horizontal scanning spot of the TV monitor.

2. The system of claim 1, wherein the processor comprises:

a converter for converting between an analog video signal and a digital signal;

an image-processing means for image-processing the digital signal of an image in response to a program control and an input control for display on a monitor.

3. The system of claim 1, wherein the information signal comprises at least one of AGC, γ, gain, set-up on/off state, speed of shutter, motion mode, or image processing.

4. The system of claim 1, wherein the outputting means includes a switch for selectively outputting to the TV monitor the superposed input signal or the information signal.

* * * * *